United States Patent Office 3,445,892
Patented May 27, 1969

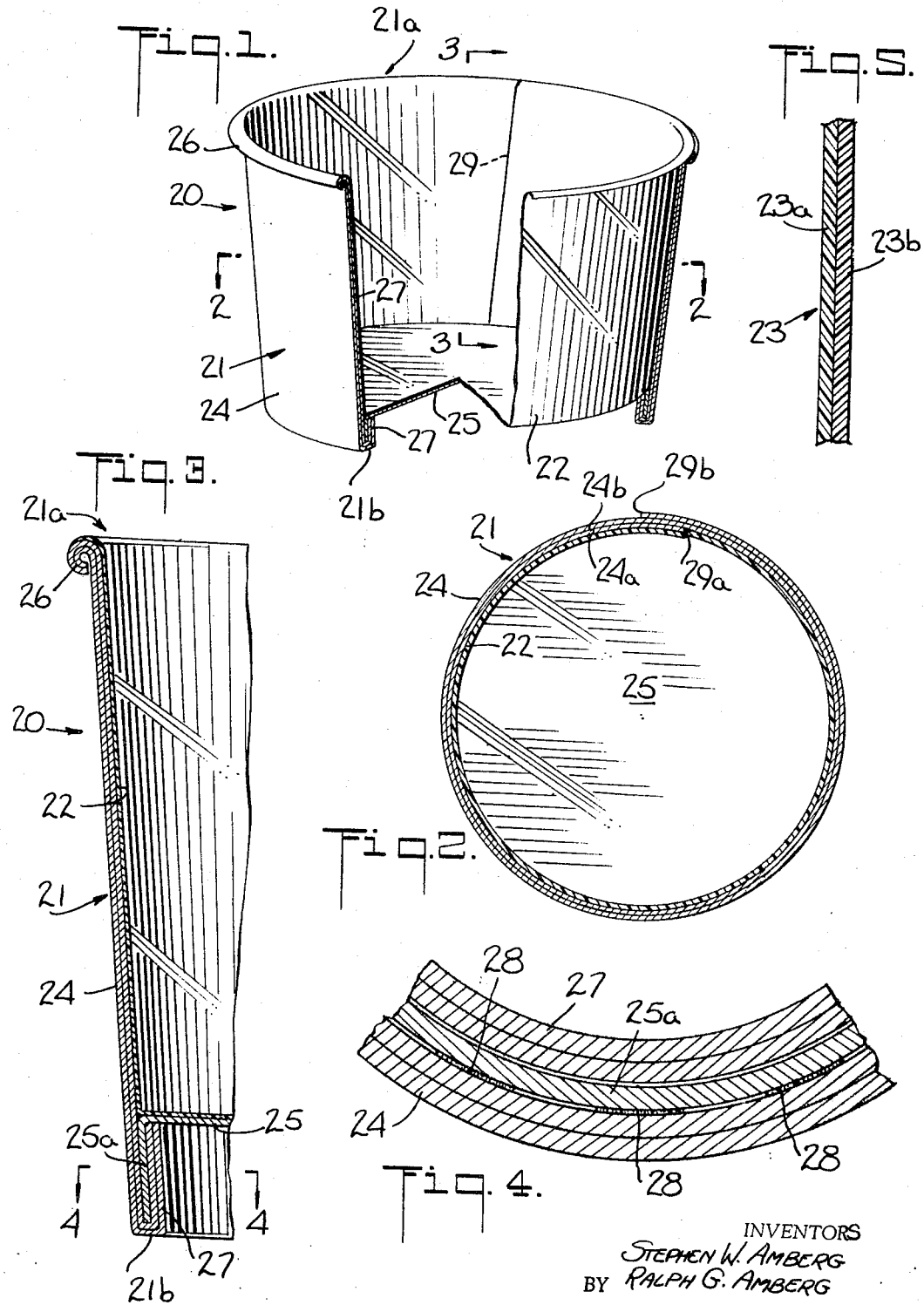

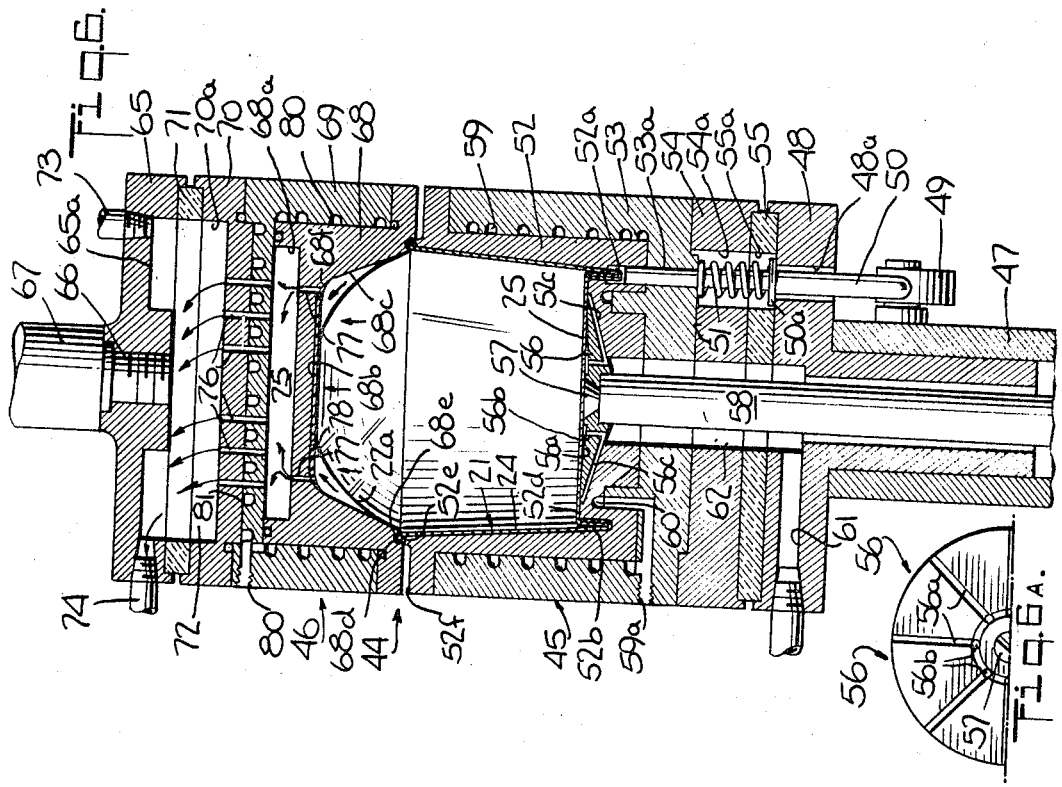

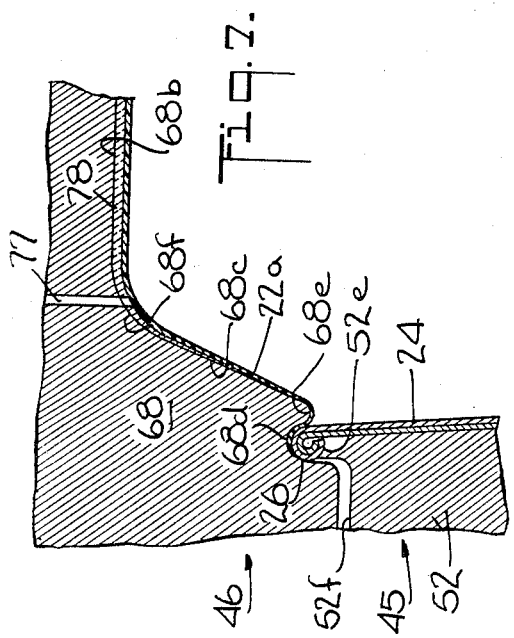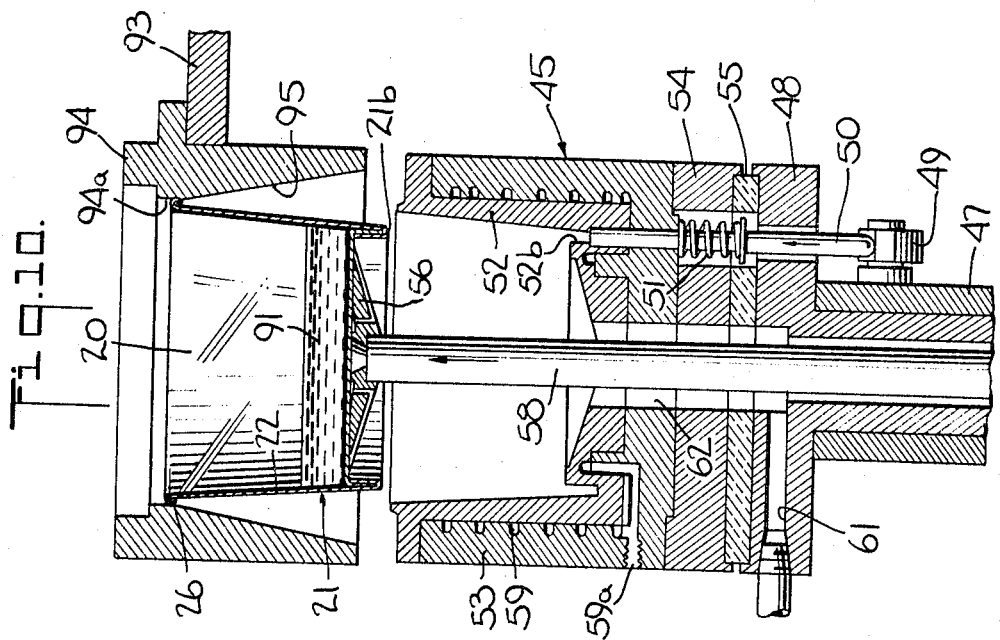

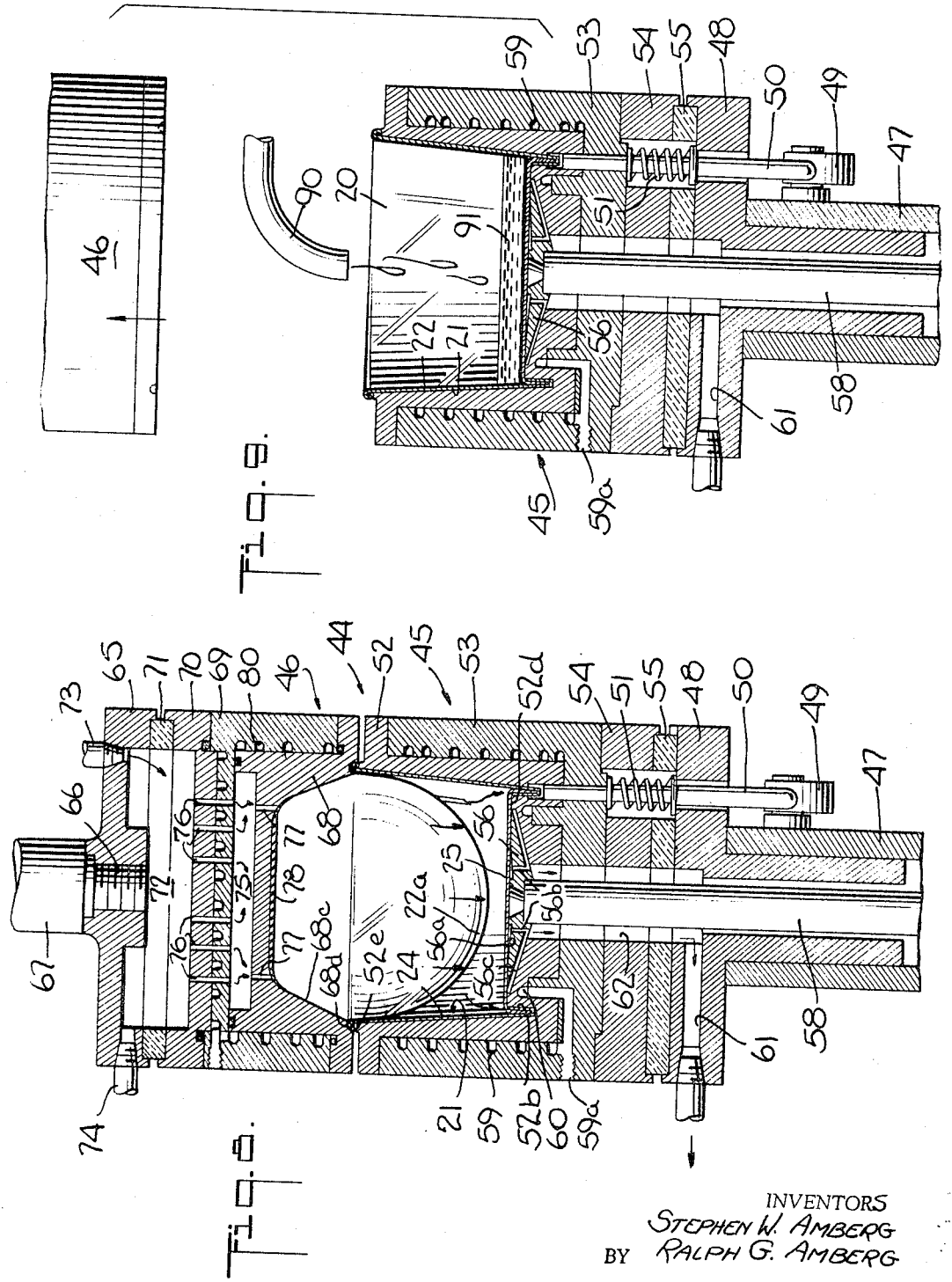

3,445,892
PLASTIC LINERS IN RECEPTACLES
Stephen W. Amberg, St. James, N.Y., and Ralph G. Amberg, Monticello, Ind., assignors, by mesne assignments, to Owens-Illinois, Inc., Toledo, Ohio, a corporation of Ohio
Filed Dec. 4, 1964, Ser. No. 415,930
Int. Cl. B29c 17/00
U.S. Cl. 18—19                                           16 Claims

ABSTRACT OF THE DISCLOSURE

Method of forming an unseamed plastic film liner for a receptacle such as a deep-draft receptacle, by partially prestretching the film area in direction generally perpendicular to its plane, and then fully stretching the film in opposite direction into conforming relation with the interior of the receptacle, using heat and fluid pressure. Laminate of lower softening temperature plastic material on liner commensurately bonds liner to receptacle. Upper and lower cavity die socket apparatus for controlling shape of liner material and application of heat and fluid pressure to liner material during said forming. Receptacle having "skip seal" joint at bottom plug, and unseamed plastic film interior liner bonded thereto using other plastic material, and using said method.

---

This invention relates to receptacles, particularly those made of paper or the like, which are used as containers for comestible and non-comestible items, or as drinking cups or for other purposes. More particularly, the invention relates to the provision of full, unseamed plastic liners in such receptacles.

Although the invention may be useful in connection with shallow-draft receptacles such as trays or the like, it is particularly useful when applied to relatively deep-draft receptacles and therefore will be described in connection with such use. Moreover, and although the method and apparatus which the invention provides has been successfully employed in applying a liner of polypropylene film material to a paper container as will be described, it will be understood that other plastic film materials which are heat-stretchable might serve as the liner material, and that receptacles made of material other than paper might be provided with a plastic liner using the method and apparatus of the present invention.

In the packaging of comestible and non-comestible items, particularly those of liquid or semi-liquid consistency such as cottage cheese, fruit salad, oil, grease, solvents, acids, bases and others, and also in the provision of containers, including drinking cups, for heated items such as hot coffee, soup and the like, it is desirable that the receptacles for the goods be made of commonly employed low-cost materials such as paper or other fibrous materials, or plastic, and that the receptacles be formed using conventional techniques, such as those which provide a lapped-type seam in the receptacle body and an adhesively secured bottom closure of a familiar form. However, such commonly employed materials are not always themselves impervious to the nature of the substance to be contained and may be chemically attacked thereby, or may be relatively porous such as to absorb or permit filtering of the contained substance therethrough, or may contain even small percentages of chemical elements, used as binders or the like, which are dissolvable in the contained substance, particularly comestibles, such as to deleteriously affect the container contents. But whether or not the receptacle material is ideally impervious and otherwise suitable for use as a container, considerable difficulty has always been experienced in bonding the lapped seams, and in forming the bottom joints in such receptacles so that they do not leak.

Accordingly, it has been recognized that a full plastic interior liner, i.e., one which itself has no seams and extends continuously to cover the bottom as well as the interior wall including the bottom joint and side seam of such a receptacle, would be effective to provide an impervious and leakproof container. Hot spraying or dipping techniques for applying such a full plastic interior liner are undesirable for a number of reasons, and it is therefore desirable that the liner be applied in film form. Although preformed film liners for the purpose are known, they involve manufacturing and handling operations in addition to the step of applying the liners to the receptacles; more often do not have uniform film thickness in the formed condition; do not always properly fit into the receptacles; and in any event are not either effectively or conveniently bonded to the receptacle bodies. Moreover, techniques as have been used to form film-type plastic liners involve either expensive or not easily controlled apparatus, or apparatus which often sticks to, or causes rupture of the liner material during either the liner forming or the liner application operations.

The present invention provides a receptacle having a full and unseamed interior liner made of a plastic film, such as polypropylene, which is inert and impervious to virtually all types of substances which the receptacle might be intended to contain, and which is capable of withstanding relatively high temperatures without softening so as to further increase the range of possible uses for the receptacle. The plastic is initially in the form of a flat sheet or film and is effectively bonded to the previously and conventionally formed base receptacle in efficient and economical manner by a method and apparatus involving only heat and fluid pressure, thereby avoiding the use of a plunger or the like acting directly upon the plastic as would tend to unevenly stretch, or rupture, or stick to the liner material during the necessary step of conforming the same to the interior of the receptacle. As previously mentioned, the method and apparatus is particularly adaptable for applying such liners to deep-draft receptacles.

Briefly describing the invention in its preferred embodiment, the base receptacle which will be provided with a polypropylene plastic interior liner is a conventional, relatively deep-draft, circular container made of paper and having a convolutely wound, lapped seam type body which tapers slightly, in radially inward direction, from its mouth rim at the open top end towards the bottom end thereof. The closure which forms the flat bottom of the container has a downwardly turned peripheral skirt which is enclosed by a conventional, inwardly turned bottom skirt portion of the body. The bottom closure is adhesively secured in place, as is the longitudinally extending lapped seam of the body. However, in a modified form of the receptacle, and for a purpose as will be described, the bottom plug is secured only to the interior wall of the body by annularly spaced apart spots of adhesive, making what is known as a "skip seal" joint, rather than by full adhesive securement. The bottom skirt portion of the receptacle body is merely turned 180° inwardly, and is not adhesively secured to the inwardly facing surface of the bottom closure skirt. Because of this skirt construction the flat bottom of the receptacle, as determined by the bottom closure, is recessed upwardly so that the so-called "drawheight" of the receptacle, i.e., its interior height, is somewhat less than its overall height.

This base receptacle is provided with a full, unseamed interior liner of polypropylene which is applied in film form, the liner in the completed receptacle having substantially uniform thickness of 1½ mils (i.e., .0015″) throughout. The polypropylene material is heat-bonded to the paper receptacle using a layer or laminate of polyethylene as the adhesive. For this purpose the liner material, as initially furnished, is a sheet of non-oriented polypropylene film having a coating or laminate of polyethylene on one side thereof, the respective thicknesses of the polypropylene and polyethylene each being 2 mils so that the total film thickness of the liner material is initially 4 mils. The polyethylene is bonded to the polypropylene in a conventional manner to initially form the 2-ply film which is used as the liner material.

Although other plastic liner materials might be used for particular applications, polypropylene was selected for use in the preferred embodiment because of its high softening point of from about 275° to 320° F., and its high tensile strength and stretchability at temperatures below its softening point. Of course, polypropylene resists most solvents and is non-porous, and for these reasons is a good liner material. Polyethylene was selected as the heat sensitive bonding material because of its lower softening point of from about 220° F. to about 265° F. (depending on the process by which it is made) as compared to the softening point of the polypropylene principal liner material, and because of the good bond which it will form with both the paper receptacle and the polypropylene liner film. Thus, a laminated film of polypropylene and polyethylene can be heated to a temperature below the comparatively high softening point of the polypropylene but at which the polyethylene is rendered very tacky, if not molten, whereupon the 2-ply sheet may be stretched and bonded by the polyethylene to paper material. It will therefore be understood that other plastic combinations might be used so long as the plastics have similar properties as compared with each other and with the material of which the base receptacle is made.

However, and heretofore, considerable difficulty has been experienced when attempting to stretch plastic liner materials to conform to the interior of receptacles, particularly those having relatively deep draft. In the present invention, a sheet of the polypropylene-polyethylene film, in unheated condition, is first blanked out to the size and shape of the receptacle mouth rim. Without heating the central area of the film which is circumscribed by the receptacle mouth rim, and with its polyethylene side facing down, the film disc is then simultaneously placed on and firmly tacked to the receptacle mouth rim, about the entire periphery thereof, by heating the peripheral film portion which is disposed on the mouth rim to a temperature above the softening point of the polyethylene.

After the film has been tacked to the receptacle mouth rim but before attempting to stretch the film, the base receptacle is itself heated to a temperature above the softening point of polyethylene but below that of polypropylene, the central area of the tacked film being left exposed so that it will be preliminarily heated to some extent, and the tacked edge of the film being clamped against the receptacle mouth rim to eliminate any possibility of separation.

With the peripheral edge of the film still clamped to the receptacle mouth rim, the film is then simultaneously subjected to partial stretching in upward direction to a height which is less than the aforementioned "draw-height" of the receptacle, and to further heating in manner as will be explained. In the preferred embodiment, the final configuration of the upwardly billowed and thus pre-stretched and heated film is that of a dome having a flat top and a downwardly and outwardly flared sidewall periphery, the sidewall residing at substantially 70° to the horizontal and merging with the flat top in a smooth, arcuate section. The sidewall of the dome is formed by a peripheral zone of the original, flat film, the zone being of substantial width extending inwardly to a central area of the film which is only slightly smaller than the area of the flat bottom of the base receptacle and which forms the referred to flat top portion of the dome.

The manner in which the film is stretched and heated during this pre-stretching operation is such as to provide a film-thickness gradient in the referred to peripheral zone thereof from about 1½ mils immediately adjacent the receptacle mouth rim to about the thickness (i.e., 4 mils) of the original film when all of the peripheral zone is at its aforementioned angle of repose of 70° in the pre-stretched dome configuration, and to retain the aforementioned central area of the film at substantially its original uniform thickness throughout. The accompanying heating is such as to ultimately heat all of the pre-stretched peripheral zone of the film to a substantially uniform temperature above the softening temperature of the polyethylene, and to ultimately heat the substantially unstretched central area of the film to a substantially uniform temperature somewhat below the polyethylene softening point. However, and so as to assist in providing the referred to thickness gradient in the peripheral zone as it ultimately resides in its prestretched shape, the final temperature heat is applied to the zone in a progressive, rather than simultaneous manner during the prestretching operation, albeit the pre-stretching and heating is performed in a brief interval of time. That is, heating of the zone occurs first in the annular region immediately adjacent the receptacle mouth rim and lastly in the annular region adjacent the flat, central area of the film. These progressively heated annular elements of the zone remain in engagement with and continue to be heated by the heat source as succeeding elements come into such engagement. Although it is not actually known, it is thought that the aforementioned thickness gradient occurs in the following manner: As the film is drawn upwardly, the first annular element engages the heat source and is rendered more stretchable before the succeeding elements are heated to the same extent. The tensile strength of the film in this first elemental region is thereby reduced below that of the remainder of the zone so that the film immediately stretches and thins in this region prior to such stretching and thinning of the elemental areas which thereafter engage the heat source. As a consequence, and perhaps also due to the slightly greater time during which the preceding elements are in engagement with the heat source, the elements as they engage the heat source are stretched and thinned to a progressively lesser extent.

The liner film is held in this pre-stretched upwardly billowed or domed condition for a period of time so as to thoroughly and uniformly heat the same to the desired respective temperatures of its peripheral and central portions. The film is then forced downwardly into the now fully heated receptacle. This downward forcing is performed entirely by fluid pressure which, in the preferred embodiment and as will be seen, is a combination of vacuum and air pressure. During the downward forcing of the heated film into the deep draft base receptacle the film will stretch and thin least within the previously stretched peripheral zone, albeit progressively more towards the center of the film in inverse proportion to the gradient-stretching and thinning within the zone as previously mentioned, and will stretch and thin considerably within the central area of the film. As a result, the film has uniform thickness of about 1½ mils as it is finally disposed on and bonded to the base receptacle. It will be noted that the polyethylene bonding material is very tacky, if not fully molten within the peripheral zone, and at least at a "tacky" temperature within the central zone of the film at the time it is initially forced into conforming relation with the interior of the receptacle, but that the heated receptacle promptly renders all areas of the polyethylene very tacky or molten upon contact.

While still exerting fluid pressure such as will keep the hot film in place, the receptacle and its now full-fitting interior liner is cooled. In the preferred embodiment, the cooling is in air, assisted by chilling with cold water poured into the receptacle to a height of about ¼". Upon cooling, the polyethylene secures the polypropylene primary liner to the receptacle.

The method of forming and bonding liners in receptacles according to the invention is conveniently carried out using apparatus as will also be described.

The receptacle with the film tacked in place as previously described is placed in what is referred to herein as the lower cavity die of an upper and lower cavity die apparatus which is heated to the temperatures previously mentioned. The lower cavity die includes a vertically movable bottom plate which will subsequently be used as a receptacle ejector and which is heated to a higher temperature than the remainder of the cavity, as will be described, and apertures for drawing a vacuum within the die from in and around its bottom plate ejector.

What will be termed the upper cavity die of this apparatus operates in conjunction with the lower cavity die both to pre-stretch and to subsequently conform the heated film to the receptacle. That is, the upper cavity die has apertures through which both a vacuum will be drawn to pre-stretch the film in upward direction as aforesaid, and a subsequent pressure of air will pass to assist in fully conforming the heated film to the receptacle after the film has been drawn in downward direction by the vacuum of the lower cavity die, all as will be more fully explained. These interior apertures of the upper cavity die are disposed in spaced apart relation in a circular pattern at the top of the die, as will be seen.

The upper cavity die is of particular inverted dome-shaped configuration. In the preferred embodiment, the recessed height of the dome is about three-fifths of the "draw-height" of the receptacle, and the interior annular wall of the dome is inclined inwardly at an angle of 70° to the horizontal. The inclined wall is filleted, on a radius of ½", where it merges with the flat, centrally disposed overhead area of the dome. Although the entire upper cavity die is heated, the flat central area is partially insulated to provide a localized surface temperature thereat which is below the softening temperature of polyethylene, whereas the remainder of the interior wall of the die is maintained at a temperature above the softening temperature of polyethylene. The peripheral lower edge of the upper cavity die is shaped to accommodate, and clamp the film against the conventional beaded mouth rim of the receptacle when the upper cavity die is closed upon the lower cavity die during both the liner pre-stretching and the subsequent liner forming operations.

While the receptacle with the as yet unstretched liner material tacked in place is in the lower cavity die with the upper cavity die closed thereon, the base receptacle is heated by the lower cavity die for a relatively short period of time, as aforesaid. After the receptacle has been thus pre-heated (during which the liner material is also preliminarily heated), a vacuum is drawn through the upper cavity die to billow the liner material in upward direction and pre-stretch the same in the previously described manner. The film conforms to the inverted-dome shaped interior of the upper cavity die and is allowed to remain in this condition for a brief period of time so as to become thoroughly heated to the desired temperatures.

Thereafter, the vacuum in the upper cavity die is terminated and a vacuum is drawn through the lower cavity die to invert the billowed form of the liner material and conform the same to the interior of the base receptacle within the lower cavity die. However, during a terminal portion of the conforming operation, air pressure is introduced through the upper cavity die vacuum apertures to assure full stretching and conforming of the liner material to the receptacle interior. The air pressure is terminated after the brief forming operation, the upper cavity die is then raised to expose the now formed liner to air and, while the vacuum is still maintained in the lower cavity die, cold water is poured into the receptacle for chilling purposes as aforesaid. After a period of cooling, the receptacle is ejected from the lower die cavity, inverted to remove the cooling water, and is then in finished condition.

These and other objects, features and advantages of the invention will become more fully apparent from the following detailed description thereof when taken together with the accompanying drawings, in which:

FIGURE 1 is a perspective view of a fully lined receptacle in accordance with the invention, portions thereof being broken away to better illustrate its construction;

FIGURE 2 is a sectional plan view of the receptacle, the section being taken at lines 2—2 of FIGURE 1;

FIGURE 3 is an enlarged and fragmentary cross-sectional view of the receptacle, the section being taken as indicated by lines 3—3 in FIGURE 1;

FIGURE 4 is a still further enlarged and fragmentary sectional showing of the receptacle, the view being taken at lines 4—4 of FIGURE 3;

FIGURE 5 is a greatly enlarged cross-sectional showing of only the plastic liner material which is used to line the receptacle of FIGURE 1;

FIGURE 6 is an elevational showing in cross-section of so-called upper and lower cavity die apparatus as may be used in applying a liner to a receptacle in accordance with the invention, this view being also used to illustrate certain steps of the operation;

FIGURE 6A is a fragmentary top plan view of a receptacle ejector plate of the apparatus of FIGURE 6;

FIGURE 7 is an enlarged fragmentary view in cross-section of only a corner portion of the upper cavity die of the apparatus of FIGURE 6, the view also illustrating the condition of the liner material after a step of the operation;

FIGURE 8 is a view of the apparatus of FIGURE 6, but illustrating another step of the operation;

FIGURE 9 is a view of the apparatus of FIGURE 6 during another step of the operation wherein the upper and lower cavity dies are separated, only the lower cavity die being shown in cross section; and FIGURE 10 is an elevational view in cross section of only the lower cavity die apparatus of FIGURE 6 as it appears with further apparatus used in conjunction therewith to remove the now fully lined receptacle therefrom.

Referring first to FIGURE 1, a receptacle in accordance with the invention is generally indicated by reference numeral 20. The receptacle consists of what will be referred to herein as a "base receptacle 21," of stiff paper or the like, to which a plastic liner 22 has been applied. In the preferred embodiment, the liner 22 is the laminated film material 23 which, as illustrated in FIGURE 5, consists of a layer of polypropylene film 23a which will serve as the primary liner material, and a layer of polyethylene film 23b which is bonded to the polypropylene layer 23a in conventional manner and which will serve to bond the polypropylene film to the base receptacle 21, as will be described.

Considering the base receptacle 21, and although other shapes, sizes and materials may be used, it is a 12-oz. capacity, circular shaped receptacle having a tapered paper body 24 and a paper bottom closure 25. At its upper, open end 21a the base receptacle 21 has a periphery extending beaded mouth rim 26 which is conventionally formed by outwardly turning the upper edge of the body 24. At the lower end edge 21b of the base receptacle, the receptacle body 24 is turned inwardly and upwardly to provide a bottom skirt 27 of the body which, together with the end edge 21b, encloses a downwardly turned peripheral skirt 25a of the bottom closure 25 to support the bottom closure in a well-known manner. However, and as shown in FIGURE 4, the bottom closure skirt 25a is secured only along its outwardly facing peripheral surface to the adjacent, inwardly facing surface of the body 24, and the securement is by spaced apart spots of adhesive 28, such as glue type adhesive, to provide what is known as "skip seal" bond between the two. The opposite interface between the bottom closure skirt 25a and the body skirt 27 is not adhesively secured, the skirt being merely upwardly turned and pressed against the bottom closure skirt 25a during the receptacle forming operation. As will later be more fully understood, in applying the plastic liner 22 to the interior of the base receptacle 21, it will be desired to draw a vacuum through the closed bottom of the receptacle. The skip seal provided by spots of adhesive 28, as well as the absence of adhesive securement between the bottom closure skirt 25a and the upwardly turned body skirt 27, will facilitate the drawing of the vacuum through the bottom of the base receptacle. This is especially true where the bottom closure 25 is made of air-impervious material, such as plastic, although in the preferred embodiment the bottom closure 25 is made of paper which is somewhat air-pervious and will therefore itself facilitate the drawing of the vacuum.

As illustrated in FIGURE 2, the base receptacle body 24 is formed by convolutely winding a paper blank in a conventional manner to provide a two-ply body structure, the plies being respectively indicated by reference numerals 24a and 24b. The body 24 has a lapped and adhesively secured longitudinal seam which is generally indicated by reference numeral 29 in FIGURE 1. Although once-around winding may be employed to provide the lapped seam, the twice-around winding as illustrated in FIGURE 2 provides an inner seam 29a where the innermost ply 24a overlaps itself to become the outermost ply 24b, and an outer seam 29b where the outermost ply 24b overlaps itself at its terminal end. The inner and outer winding plies 24a, 24b may be adhesively secured together, as by gluing throughout their areas in conventional manner, and as would also include a similar adhesive bonding of the lapped seam 29.

The 12-oz. capacity base receptacle being described is considered as having relatively deep draft. Its overall height is nominally 3″ and its bottom closure 25 is recessed upwardly about ½″ from its lower end edge 21b so that what will be referred to as the "draw height" of the receptacle is 2½″. The receptacle diameter at its mouth rim 26 is nominally 4¼″, and the body 24 tapers inwardly in the downward direction to a diameter of approximately 3½″ at its lower end edge 21b. However, it will be understood that receptacles having larger capacities and deeper draft heights may also be used.

Referring now to the material which is used to form the receptacle liner 22, it comprises two different materials, the first serving as the primary liner material and being a plastic in sheet or film form which is strong and stretchable at elevated temperatures, and the second serving as a heat sensitive bonding material having a softening temperature considerably below that of the primary liner material and, of course, below that of any plastic material of which the base receptacle is made. In the embodiment of the invention being described, and as illustrated in FIGURE 5, the primary liner material is a sheet of cast polypropylene film 23a having a softening point within a range of from about 275° F. to 320° F. The heat sensitive bonding material is a layer 23b of medium density polyethylene, applied and bonded in extruded form to one side of the polypropylene film which has been previously treated using a corona discharge process to insure a firm bond. The polyethylene film has a softening temperature of from about 220° F. to 230° F. The two-ply laminated film material is indicated by reference numeral 23.

The respective thicknesses of the laminated film layers 23a, 23b are selected in accordance with the desired ultimate thickness of the liner 22 and the extent of stretching and consequent thinning which the material must undergo in accordance with the draw-height and diameter of the base receptacle to which it will be applied. Considering that the primary liner material is polypropylene, it has been found that an ultimate uniform thickness of 1½ mils in the formed liner 22 is desirable for most circumstances of use. Accordingly, in the liner material 23, the polypropylene film layer 23a has initial thickness of 2 mils. Further, and considering the thinning of the bonding material as will occur and the amount thereof as will be required to form a good bond between the polypropylene film 23a and the paper material of which the base receptacle 21 is made, the polyethylene film layer 23b has initial thickness of 2 mils. The total initial thickness of the film material 23 is therefore 4 mils.

Upon heating the laminated sheet 23 of these materials, it will be understood that the polyethylene ply may be rendered highly tacky or even molten while the polypropylene ply remains in its solid form. Further, at temperatures above the softening point of polyethylene but below the softening point of polypropylene, the polypropylene film is highly stretchable. Accordingly, it will be understood that other plastic film laminates wherein the different plastics which form laminated construction have dissimilar softening points might be used, so long as the plastic which is regarded as the primary liner material has the higher softening point and is heat stretchable, as well as having other characteristics which are desirable in the ultimately formed liner.

Considering now the manner in which the plastic liner 22 is formed and bonded to the base receptacle 2, a disc of the liner material 23 is blanked out from a continuous sheet of the material and tacked to the beaded mouth rim 26 of the base receptacle by a film blanking and tacking apparatus (not shown). Because as seen in FIGURE 3 the receptacle adjacent its lower end edge 21b has a thickness of five plies of paper, it may be desirable to include a heating element in such apparatus to preliminarily heat the bottom part of the receptacle during the film blanking and tacking operation so as to assure that the bottom joint at the interior of the receptacle ultimately becomes fully heated. However, it has been found that such preliminary heating of the bottom of the receptacle is not always necessary.

In the blanking and tacking operation, a continuous sheet of film material is fed to a position above and across the receptacle to be lined. The film material is at the time in unheated condition. As previously explained, because the polyethylene ply of the film material is employed as the bonding material between the polypropylene ply and the paper material of which the base receptacle 21 is made, the polyethyelene ply of the material faces downwardly. A flat blank of the film material, conforming in size and shape with the receptacle mouth rim 26, is cut from the film sheet and concurrently tacked to the receptacle mouth rim 26. Considering that the softening point of polyethylene is about 220° F. and the minimum softening point of polypropylene is about 275° F., the tacking is done at a temperature of about 250° F. The operation is such that the tacking apparatus is in contact with the film blank for only about two and one-half seconds as it firmly tacks the film periphery to the receptacle mouth rim 26, during which time the central area of the film should be shielded from the tacking heat. The base receptacle 21 with the film disc thus tacked thereon is then placed in an upper and lower cavity die apparatus which is generally indicated by reference numeral 44 in FIGURE 6.

The upper and lower cavity die apparatus 44 comprises a stationary lower cavity die 45 for receiving the receptacle and a co-mating upper cavity die 46 which is vertically movable with respect to the lower cavity die, as indicated in FIGURE 9, to open and close the apparatus. In FIGURE 6, the apparatus 44 is shown in its closed position enclosing the base receptacle 21 and its attached film disc 22a therein for the film pre-stretching and subsequent liner forming operations as will be explained. However, before proceeding with a description of these operations, the construction of each of the cavity die sections 45 and 46 will be described in detail.

Referring first to the lower cavity die 45 as shown in FIGURE 6, it is mounted on a support 47 by a steel mounting plate 48. A pivotable lever 49 is mounted on the support 47 for actuation of a vertically movable receptacle knock-out plunger 50 which is normally biased into its illustrated downward position by the spring 51, the spring bias acting upon the plunger shoulder 50a which rests against the mounting plate 48. The length of the plunger 50 below its shoulder 50a extends through a suitable vertical aperture 48a of the mounting plate, and its length above the shoulder 50a extends into a cylindrical aperture 52a of an aluminum die socket 52 as shown. The socket 52 fits into and is attached, as by screws (not shown), to what will be referred to as the socket heating chamber unit 53 which is also made of aluminum and which is in turn attached, as by screws (not shown), to the mounting plate 48. Between the heating chamber unit 53 and the mounting plate 48 there is a steel base plate 54 and a heat insulator 55, the latter being of Marinite or similar material. It will be noted that the upper length of the plunger 50 is slidable within the die socket aperture 52a and a similar underlying aperture 53a through the bottom of the heating chamber unit 53, and that the upper end of the spring 51 rests against the underside of the unit 53. To accommodate the spring 51, aligned and widened apertures 54a, 55a are formed through the base plate 55 and the insulator 55, respectively, as shown. Further, it will be noted that the interior of the die socket 52 conforms to the exterior size and shape of the receptacle 51, including an annularly extending bottom groove portion 52b for receiving the downwardly projecting lower end edge 21a of the receptacle, and that the cylindrical aperture 52a projects upwardly from the underside of the die socket 52 to a terminus about mid-way along the height of the groove portion 52b. The upper end of the knock-out plunger 50 is normally disposed immediately below the bottom of the groove portion 52b, as shown. Accordingly, upon upward pivoting of the lever 49, the plunger 50 will be lifted so that its upper end enters the groove portion 52b to press positively upward against the receptacle lower edge 21a and assure its disengagement from the groove when the finished receptacle is to be ejected from the lower cavity die 45.

Further in connection with the ejection of the finished receptacle from the lower cavity die 45, the bottom of the die socket 52 is conically recessed, as at 52c, to receive a receptacle ejector plate 56 which is attached, as by a flat head screw 57, to a vertically movable ejector shaft 58 which extends upwardly through the bottom of the apparatus as shown. The upper surface of the ejector plate 56 is flat excepting for its radially extending vacuum channels 56a (see FIGURE 6A) and, as does the flat head of the screw 57, normally resides within the plane of the flat bottom portion 52d of the die socket 52. Thus, and referring briefly to FIGURE 10, it is seen that the ejector plate 56 will lift the finished receptacle from the lower cavity die 45 upon upward movement of the ejector shaft 58, the movement of the shaft being by suitable means (not shown).

As perhaps best shown by FIGURE 7, the upper peripheral edge of the die socket 52 is arcuately recessed, as at 52e, to receive the underside of the receptacle beaded mouth rim 26. Outwardly of this upper peripheral edge, the die socket top surface 52f is recessed downwardly to provide operating clearance between the upper and lower cavity dies, thus to assure firm contact of the upper cavity die 46 with the receptacle mouth rim.

The heating chamber unit 53 is provided with a spiral-shaped channel 59, extending throughout its height, at its interior surface which is in interfacing relationship with the die socket 52. The lower end of the channel 59 joins with a laterally extending oil inlet passage 59a through which hot oil, heated to a temperature of about 280° F. is introduced from a source (not shown) so as to enter the spiral channel 59 to heat the heating chamber unit 52. As shown in FIGURE 6, the oil inlet passage 59a also introduces hot oil to a circular-shaped oil circulating channel 60 located at the underside of the die socket 52 for heating the bottom of the die socket as well as the aluminum ejector 56. An oil outlet passage from these channels (not shown) is also provided. Of course, the die socket 52 and ejector 56 might be heated by other means, such as electrical heating elements. In any event, the arrangement is such as to heat and maintain all of the interior wall surfaces of the die socket 52, including its bottom groove 52b, flat bottom portion 52d, and upper peripheral edge 52e and including ejector plate 56, to a temperature of about 250° F., although the ejector plate and lowermost surfaces of the socket will probably be heated to a somewhat higher temperature, as is desired, due to the upward direction of flow of the heated oil. Of course, the socket temperature should be below 275° F., the minimum softening point of the polypropylene.

As previously mentioned, during the liner forming operation a vacuum will be drawn through the lower cavity die 45 and, for this purpose, a vacuum channel 61 is formed in the mounting plate 48 which will be connected with an exterior vacuum source (not shown). At its inner end, the vacuum channel 61 opens into a vacuum chamber, generally indicated by reference numeral 62, which is formed by suitably widened and aligned central apertures of the lower cavity die component elements 48, 52, 53, 54 and 55, as shown. As will be understood from a comparison of FIGURES 6, 6A and 10, the vacuum which is drawn through the chamber 62 and channel 61 reaches the underside of the receptacle 21 by means of the annularly spaced apart vertical vacuum channels 56b of the ejector 56 which connect respectively with the forementioned radially extending top surface vacuum channels 56a (see FIGURE 6A), and by means of the additional radially extending vacuum channels 56c formed in the underside of the ejector 56 which are respectively disposed directly under the upper surface channels 56a so that they are not visible in FIGURE 6A. An additional circular-shaped vacuum channel 56d is formed in the top surface of the ejector 56 interconnecting the vacuum channels 56a as well as the vacuum channels 56b. Thus, it will be understood that a vacuum may be applied directly to the underside of the receptacle 21 via the vacuum channels 56a and 56d, and via the circular-shaped spacing (not numbered) between the outer periphery of the ejector 56 and the flat bottom portion 52d of the die socket, which spacing forms a vacuum channel to which the radially extending vacuum channels 56c connect. In this regard, it should be noted that the paper material of which the bottom closure 25 of the base receptacle 21 is made in sufficiently porous, or air-pervious, so as to permit the drawing of a vacuum therethrough.

Referring now to the construction of the upper cavity die 46, as shown in FIGURE 6, it includes a steel mounting plate 65 by which it is attached, as by a threaded connection 66, to the lower end of a vertically movable shaft 67. The vertical movement of the shaft 67 (by means not shown) is for the purpose of opening and closing the apparatus 44, as indicated by a comparison of FIGURES 6 and 9 for example. The dome-shaped die socket 68, which is made of aluminum for good heat transfer, fits into and is attached, as by screws (not shown), to an upper cavity die socket heating chamber unit 69 which is also made of aluminum. The latter is, in turn, attached by screws (not shown) to the mounting plate 65, an aluminum baffle plate 70 and an insulator 71 being disposed as shown between the two. The insulator 71 is of a hard type insulating material, such as Marinite, and is ring-shaped to form a wall portion of an air and vacuum upper chamber 72. The upper wall of the interiorly located upper chamber 72 is formed by an annular recess 65a of the mounting plate 65, and its lower wall is formed by an interior recess 70a of the baffle plate 70, as indicated in FIGURE 6.

An air pressure connection 73 is provided in the mounting plate 65 for admitting air to the upper chamber 72 from an air pressure source (not shown) at a particular time during the operation. A vacuum connection 74 is also provided in the mounting plate 65 for connection to an exterior vacuum means (not shown) for drawing a vacuum within the upper chamber 72 at a different time during the operation and, as in the case of the vacuum drawing means connected to the lower cavity die 45, it will be understood that the outside air pressure and vacuum sources (not shown) are suitably regulated and provided with control means for admitting air and drawing the vacuum, as the case may be, at the required times.

It will also be noted that an air and vacuum lower chamber 75, which acts as an equalizing plenum, is formed by a recess 68a between the die socket 68 and the top of the heating chamber unit 69, and that the two chambers 72, 75 are connected by a plurality of vertically disposed air and vacuum channels 76 which extend through both the heating chamber unit 69 and the baffle plate 70, as shown. The channels 76 are arranged in a circular pattern and are located at the semi-quadrant location in each of the three radially spaced apart rows thereof as indicated, and thus distribute the air and vacuum pressures more or less evenly within the lower chamber 75. The air pressure is introduced from the lower chamber 75, and vacuum is drawn within the die socket 68 via the single, circular-patterned row of twenty-four additional air and vacuum channels 77 extending through the upper wall of the socket 68. In the preferred embodiment being described, these additional channels 77 are formed by small (No. 55) drill holes spaced 15° apart on a radius of 1½ inches, which causes them to be peripherally disposed with respect to the flat central portion 68b at the top of the die socket 68, as shown. In this connection, it will be noted that a semi-insulator member 78 is attached to the top of the dome, and the channels 77 may pierce the disc-shaped semi-insulator member 78 as shown, or the insulating member 78 may have smaller diameter so that the channels 77 are adjacent its outer periphery. It should also be understood that the radius on which the channels 77 are disposed may be somewhat less so that they are located immediately inside the periphery of the flat central portion 68b.

The insulator member 78 is a sheet of paper (thickness about .020″–.030″) suitably secured, as by gluing to the flat central portion 68b of the dome. However, semi-insulating materials other than paper, such as a thin sheet of stiff plastic, or a thin sheet of asbestos, might also be used as the insulator 78.

Referring further to the interior dome shape of the die socket 68, in addition to its flat, top central portion 68b, it has a tapered sidewall 68c having a slope of 70° measured with respect to the horizontal, and a lower peripheral edge (not numbered) which includes an annularly extending arcuately recessed portion 68d for receiving the rounded top edge of the receptacle bead 26 and an annularly extending and downwardly projecting beaded portion 68e for holding the film 22a firmly against the receptacle bead 26 and which is thought to assist the film prestretching operation to be described.

The tapered sidewall 68c has, of course, truncated conical configuration and is faired into the top central portion 68b by a comparatively wide-arc fillet 68f, the fillet radius being ½″ in the embodiment being described. The dome-height of the die socket 68 is, in the described embodiment, equal to about three-fifths of the draw-height of the receptacle (i.e., the height of the lower cavity die socket 52 between its upper peripheral edge 52e and its flat bottom portion 52d). However, it is thought that a dome height in the upper cavity die socket 68 which is equal to only one-half of the draw height of the receptacle may also be satisfactory. Further, the particular angle of slope of the sloping sidewall 68c appears to be critical, at least within some range approximating 70°. That is, it appears that neither a vertical sidewall, nor a sidewall which slopes at 45° is satisfactory, although a sidewall slope of greater than 45° but less than 90° may be satisfactory depending upon the receptacle diameter-to-draw height ratio and perhaps other factors.

The upper cavity die apparatus 46 is heated by hot oil which flows at a temperature of about 280° F. through a spiral-shaped channel 80 which extends throughout the height of the chamber unit 69 at its interior surface which is adjacent the die socket 68, and through a continuously extending and circular-patterned channel 81 which is formed throughout the area of the upper surface of the chamber unit 69 where it abuts against the baffle plate 70, the oil being admitted to both these channels 80, 81 via the oil inlet passage 80a, all as indicated in FIGURE 6. Of course, a hot oil source (not shown) is connected to the oil inlet passage 80a, and an oil outlet passage (not shown) is provided in the chamber unit 69 to permit circulation of the oil through the channels 80, 81. It will also be noted that other means might be used to heat the upper cavity die apparatus 46, such as electrical heater means, steam, or the like.

Referring now to the film pre-stretching and final forming operations as are performed in the upper and lower cavity die apparatus 44, the apparatus is first heated to a temperature of about 250° F. along the interior surfaces of both the upper cavity die socket 68 and the lower cavity die socket 52. The ejector plate 56 at the bottom of the lower cavity die 45 will also be heated to the temperature of the bottom region of the lower cavity die 45, i.e. equal to or slightly higher than 250° F., as aforesaid. However, the semi-insulator 78 at the top of the upper die cavity, and which actually presents the flat, top portion of the dome-shape with which the film will be in contact, will be at a surface temperature of only about 200° F.

When the apparatus 44 has been thus uniformly heated, the upper cavity die 46 is raised momentarily, and the base receptacle 21 having the film disc 22a tacked thereon is placed within the lower cavity die 45 as previously mentioned. The upper cavity die 46 is then lowered to close the apparatus on the receptacle, as illustrated in FIGURE 6. The receptacle and film disc remain in this merely enclosed condition for a short period of about 2½ seconds to permit preliminary heating of the base receptacle 21, especially at its bottom closure 25 and through the five-ply thickness of material adjacent its extreme lower edge 21b. Of course, during this preheating time the film disc 22a will also be heated somewhat, and is believed to billow upwardly to some extent due to the expansion of the air within the receptacle which is entrapped by the film disc. As seen in FIGURE 7, the receptacle bead 26 and the extreme peripheral edge of the film disc 22a are enclosed by the hot, arcuately recessed peripheral edges 52e, 68d of the upper and lower cavity die sockets, and the immediately adjacent annular element of the film disc 22a is depressed and stretched somewhat by the hot, downwardly projecting beaded portion 68e of the upper cavity die socket. The polyethylene layer 23b at the underside of the film disc 22a will be rendered tacky, and the polypropylene film layer 23a will be rendered highly stretchable, and will stretch somewhat, within the narrow annular area of the film disc 22a which is in contact, or very nearly in contact with the interior surfaces 68a and 68e, respectively, of the upper cavity die socket during this preheating operation.

After the above stated interval of time, the film disc 22a is subjected to what is referred to herein as a pre-stretching operation. The film is heated to the desired temperatures throughout and pre-stretched in the upward direction by drawing it upwardly into the heated dome-shaped socket 68, the same being accomplished by the application of a vacuum at the vacuum connection 74 so as to draw a vacuum through the upper cavity die and within the vertical channels 77 of the socket 68. The vacuum is applied for a period of about 2½ seconds at pressure of 18 inches of mercury (5.85 p.s.i.a.). The film disc 22a is thus pre-stretched into conforming relation with the side wall 68c, the curved fillet portion 68f and the semi-insulating member 78 within the socket 68, as illustrated in FIGURE 7, whereupon the peripheral zone of the film which lies against the sidewall 68c will ultimately be heated to the temperature of the sidewall, i.e. about 250° F., and the central area of the film disc which lies against the insulator member 78 will ultimately be heated to the temperature of that member, i.e. about 200° F. However, and as previously noted, the film will be heated in successive increments as it is brought into contact with the sidewall 68c, and stretched in a thickness gradient of from about 1½ mils adjacent the beaded portion 68e of the socket to its original thickness of 4 mils within the central area thereof underlying the member 78.

After thus pre-stretching and heating the film disc 22a for a period of about 2½ seconds, the film is in condition for the liner forming and applying operation which next occurs within the apparatus 44 in the manner illustrated by FIGURE 8. That is, the aforementioned vacuum applied at the vacuum connection 74 of the upper cavity die 46 is terminated, and, substantially simultaneously, the same amount of vacuum (18 inches of mercury) is applied to the lower cavity die 45 via the vacuum channel 61, the vacuum chamber 62, and the ejector plate vacuum channels 56a–56c, whereupon the preheated film disc 22a will be drawn downwardly and stretched into conforming relation with the interior surfaces of the base receptacle 21. It will be noted that during this liner forming operation the film disc will be stretched to the greatest extent within the central area thereof (which has been heated to only about 200° F., but which is thicker to withstand the more normally applied and therefore greater vacuum forces which occur thereat), whereas the peripheral zone of the film which has been heated to the higher temperature of 250° and which has been pre-stretched in a thickness gradient as previously described will stretch to a lesser extent. Of course, most stretching will occur at the centermost portion of the film central area, and least stretching will occur at the film periphery adjacent the beaded mouth rim 26 of the receptacle. The rate of stretching between these locations will vary and, in general, will be inversely proportional to the thickness gradient established during the pre-stretching operation so that the film will ultimately have substantially uniform thickness throughout. The vacuum within the lower cavity die 45 is maintained for about 2½ seconds. However, during the terminal ½ second of this period, while the vacuum is still being applied, air at a pressure of 35 p.s.i.g. is applied at the air pressure connection 73 of the upper cavity die 46. The air pressure traverses the upper chamber 72, channels 76, lower chamber 75, and channels 77 to emerge within the socket areas and force the film disc 22a into even tighter fitting conforming relation with the interior of the base receptacle 21. It will be noted that, although the receptacle body 24 and the aforementioned peripheral zone of the film are at a temperature of about 250° F. during the liner forming operation, the central area of the film disc 22a, which was preheated to only 200° F. will be promptly heated to a temperature of approximately 250° F. upon contact with the receptacle bottom 25 since the latter has been heated to that temperature by the ejector plate 56 and the die socket flat bottom portion 52d against which it rests. The film will therefore be rendered more stretchable within this central area so as to assure that the polyethylene adhesive layer is rendered sufficiently tacky to form a firm bond at the bottom of the receptacle and, as it is ultimately formed, the liner 22 will be stretched to a uniform thickness of about 1½ mils throughout all of its areas.

With regard to the vacuum within the lower cavity die 45 and as it is supplied through the bottom closure 25 of the base receptacle 21, it should be noted that the paper material of which the receptacle bottom is made is airpervious and the vacuum will therefore be effectively drawn therethrough. Further, the aforementioned "skip-seal" formed by the spaced apart glue spots 28 at the bottom skirt portions 25a, 27 of the receptacle as well as the unglued relation between the upwardly turned receptacle bottom skirt 27 and the downwardly turned skirt 25a of the bottom closure, will permit the vacuum to be more effectively drawn through the bottom joint of the base receptacle 21 so that the liner film will be brought tightly against the joint.

After the 2½ second liner forming period, but while the vacuum within the lower cavity die 45 is still being applied, the air pressure at the air pressure connection 73 of the upper cavity die 46 is terminated, and the die apparatus 44 is then opened to cool and solidify the polyethylene which now adhesively secures the polypropylene liner to the receptacle. FIGURE 9 shows the apparatus as it thus appears. Although the lower cavity die 45 continues to be heated by hot oil flowing within the oil channel 59, exposure of the liner 22 to air cools the same to below the softening temperature of the polyethylene, especially in the vicinity of the mouth rim and body portion of the receptacle. However, to speed the cooling operation, especially within the vicinity of the bottom closure 25, a water outlet 90 is moved into position above the now fully formed receptacle 20, and cool water is introduced into the receptacle therefrom to a depth of about ¼" as illustrated in FIGURE 9. The water 91 chills the bottom of the receptacle, which is its hottest part, and assures firm bonding of the liner 22 to the base receptacle 21. Of course, the water 91 should be of a purified type where the lined receptacle 20 will be used to contain foodstuffs, and it is apparent that the cooling might be assisted by means other than water.

After the receptacle 20 has been thus cooled within the lower cavity die for a period of from about two to five seconds, the receptacle 20 is ejected therefrom in the manner illustrated by FIGURE 10. That is, the water outlet 90 is moved away, and a receptacle receiver arm 93 is moved into position above the receptacle. The end of the arm 93 is in the form of a ring 94 having an interior ring surface 94a in which the beaded mouth rim 26 of the receptacle 20 will snugly fit. The ring 94 includes a conically tapered surface 95 which flares outwardly below the surface 94a so as to guide the receptacle 20 into snug fitting relation within the latter. Of course, the ring 94 is axially aligned with the socket 52 of the lower cavity die 45, as shown.

The ejector shaft 58 is moved upwardly to lift the ejector plate 56 and the receptacle thereon to an elevation outside of the die socket 52 as illustrated, the beaded mouth rim 26 of the receptacle then being forced into the ring surface 94a so that the receptacle will be held by the ring. Simultaneously, the arm 49 of the lower cavity die support 47 is rotated to lift the plunger 50 against the bias of its spring 51 so that its upper end enters the die socket bottom groove 52b and lifts the bottom end edge 21b of the receptacle to assure release of the latter from the die socket. When the receptacle 20 has been received by the receiver arm 93, the ejector plate 56 and plunger 50 are lowered to their initial position, and the arm 93 is moved away from the lower cavity die 45, the latter then being unobstructed for receiving another base receptacle 21 so that the apparatus 44 may repeat the film pre-stretching and liner forming operations as previously described.

The cold water 91 is then removed from the receptacle, as by pivoting the arm 93 to invert the receptacle. The receptacle 20 is now fully formed and, as removed from the arm 93, is ready for use.

It will be found that the plastic interior liner 22 is securely bonded to the base receptacle 21, and has substantially uniform thickness throughout all of its areas, the liner extending across the side seam and bottom joint of the receptacle. The thickness of the ultimately formed liner 22 may, of course, be increased by utilizing sheet film material which has greater initial thickness than has been described. Further, it is thought that the method and apparatus as has been described may be used to apply thinner liners than has been described, and to line receptacles which have other than circular shape. In addition, the method and apparatus appears useful in forming and applying liners to tapered receptacles having open bottom ends, or to open-ended cylinders, such that the portion of the liner which would otherwise be adhered to the bottom of the receptacle, as described in connection with the preferred embodiment, simply spans across the bottom opening of such receptacle or cylinder. In such instance, the bottom portion 52d of the lower cavity die 52 and the ejector plate 56 would be maintained at a temperature below the softening point of the plastic material, such as the polyethylene layer 23b, which serves as the adhesive.

Moreover, and with regard to the forming and application temperatures, and the respective temperatures of the several areas of the apparatus, it should be noted that such temperatures in particular applications may vary from those specified. That is, the plastic liner materials may have different characteristics which would affect the operating temperatures which are selected. In addition, factors such as the desired speed of the forming operations; the thickness, or the type, or the basic weight, or the moisture content of the paper or other material used in the base receptacle; the desired depth of draw of the liner material; and other factors may affect the particular temperatures selected, or the selected initial thickness of the liner film.

It is apparent, however, that a preferred embodiment of the invention has been described which achieves all of its objects:

What is claimed is:

1. Apparatus for forming a plastic liner for a receptacle, comprising lower cavity die socket means having an open end, upper cavity die socket means closable on said open end of the lower cavity die socket means, said upper cavity die socket means having a recessed interior configuration providing a dome-shaped cavity disposed above said lower cavity die socket means open end when said upper cavity die socket means is closed on said lower cavity die socket means, said interior configuration including a central area portion and a sloping sidewall portion surrounding and flaring outwardly from said central area portion, means for heating at least said upper cavity die socket means, and means for applying fluid pressure within said closed upper and lower cavity die socket means for forcing plastic film material, initially positioned across said open end of said lower cavity die socket means, first into contiguous conforming relation with the interior of said upper cavity die socket means and thereafter from said upper cavity die socket means into said lower cavity die socket means.

2. Apparatus according to claim 1 wherein said sloping sidewall portion slopes at an included angle of substantially 110° with respect to said central area portion.

3. Apparatus according to claim 2 wherein said central portion of said upper cavity die socket means is substantially flat, and said interior configuration of the upper cavity die socket means further includes a wide-radius fillet portion between said sloping sidewall portion and said central area portion.

4. Apparatus according to claim 1 wherein said sloping sidewall portion terminates in a downwardly projecting and peripherally extending beaded portion at its lower end, said beaded portion projecting into said lower cavity die socket means when said upper cavity die socket means is closed thereon.

5. Apparatus according to claim 1 wherein the height of said dome-shaped cavity provided by said upper cavity die socket means is equal to from about one-half to about three-fifths of the interior height of said lower cavity die socket means.

6. Apparatus according to claim 1 wherein said means for applying fluid pressure comprises means defining a plurality of spaced apart vacuum openings disposed about, and substantially adjacent to the periphery of said central area portion.

7. Apparatus according to claim 6 wherein said means for applying fluid pressure further comprises means defining a vacuum equalizing plenum chamber, said vacuum openings extending between said plenum chamber and the interior of said dome-shaped cavity.

8. Apparatus according to claim 1 wherein said upper cavity die socket means further includes semi-insulator material disposed on said central area portion whereby the temperature of said central portion is below that of said sloping sidewall portion when said upper cavity die socket means is heated by said heating means.

9. Apparatus according to claim 8 wherein said semi-insulator material is paper.

10. Apparatus for forming and applying a plastic liner to a receptacle having a closed bottom end and an open top end, comprising lower cavity die socket means having an open end for receiving said receptacle with its said open top end exposed, said lower cavity die socket means having a bottom end for receiving said receptacle bottom and substantially thereagainst, upper cavity die socket means closable on said open end of the lower cavity die socket means to cover said open top end of the receptacle, said upper cavity die socket means having a recessed interior configuration providing a dome-shaped cavity disposed above said lower cavity die socket means open end when said upper cavity die socket means is closed on said lower cavity die socket means, means for drawing a vacuum within said dome-shaped cavity of the upper cavity die socket means, means for drawing a vacuum within said lower cavity die socket means from said bottom end thereof, and means for ejecting said receptacle from said lower cavity die socket means.

11. Apparatus according to claim 10 wherein said bottom end of said lower cavity die socket means includes means defining a peripherally extending groove for receiving a downwardly projecting skirt portion of said receptacle, and said receptacle ejector means comprises a vertically movable ejector plate mounted within the area of said lower cavity die socket means bottom end which is surrounded by said peripheral groove and plunger means movable into said groove to engage and unseat said receptacle skirt portion.

12. Apparatus for deep-stretch shaping of initially flat thermoplastic sheet material, comprising lower cavity die socket means having an open end and recessed interior configuration providing a mold cavity, upper cavity die socket means closable on said open end of the lower cavity die socket means, said upper cavity die socket means having recessed interior configuration providing a dome-shaped cavity disposed above said lower cavity die socket means open end when said upper cavity die socket means is closed on said lower cavity die socket means, the depth of said dome-shaped cavity being less than that of said mold cavity, means for heating said upper and lower cavity die socket means, and means for applying fluid pressure within said closed upper and lower cavity die socket means for forcing said sheet material, positioned across said open end of the lower cavity die socket means, first into said dome-shaped cavity of the upper cavity die socket means and thereafter from said dome-shaped cavity into said mold cavity of the lower cavity die socket means.

13. Apparatus according to claim 12 wherein said interior configuration of the upper cavity die socket means includes a substantially flat central area portion and a sloping sidewall portion surrounding and flaring outwardly at an included angle of substantially 110° from said central area portion, said depth of the dome-shaped cavity provided thereby being equal to from about one-half to about three-fifths of the depth of said mold cavity.

14. Apparatus according to claim 13 wherein said means for applying fluid pressure comprises means defining a plurality of spaced apart air passages disposed about and substantially adjacent to said central area portion.

15. Apparatus according to claim 14 wherein said means for applying fluid pressure further comprises means for selectively and alternately drawing a vacuum and applying positive fluid pressure through said air passages, and means for drawing a vacuum from within said mold cavity of the lower cavity die socket means.

16. Apparatus according to claim 13 wherein said interior configuration of the upper cavity die socket means further includes a wide-radius fillet portion between said sloping sidewall portion and said central area portion, and said central area portion includes means for retaining its temperature below that of said sloping sidewall portion when said upper cavity die socket means is heated by said heating means.

References Cited

UNITED STATES PATENTS

| | | | |
|---|---|---|---|
| 2,365,637 | 12/1944 | Helwig | 18—19 |
| 2,952,875 | 9/1960 | Herrick | 18—19 |
| 3,027,596 | 4/1962 | Knowles | 18—19 |
| 3,060,507 | 10/1962 | Knowles. | |
| 3,121,916 | 2/1964 | Edwards | 18—19 |
| 3,172,159 | 3/1965 | Edwards | 18—19 |
| 3,173,174 | 3/1965 | Edwards | 18—19 |
| 3,214,797 | 2/1965 | Ollier et al. | |
| 3,260,781 | 7/1966 | Lux et al. | |

WILLIAM J. STEPHENSON, *Primary Examiner.*

PO-1050
(5/69)

UNITED STATES PATENT OFFICE
CERTIFICATE OF CORRECTION

Patent No. 3,445,892              Dated May 27, 1969

Inventor(s) Stephen W. Amberg et al

It is certified that error appears in the above-identified patent and that said Letters Patent are hereby corrected as shown below:

Column 10, line 52, after "made" and before "sufficiently", change "in" to --is--.

Column 16, line 26, change first word "and" to --end--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents